United States Patent
Kim et al.

(10) Patent No.: US 8,821,826 B2
(45) Date of Patent: Sep. 2, 2014

(54) METHOD FOR REGENERATING SILICON FROM SILICON WASTE AND SILICON MANUFACTURED USING THE SAME

(75) Inventors: Gu Sung Kim, Gyeonggi-Do (KR); Kun Kul Ryoo, Gyeonggi-Do (KR); Jae June Kim, Gyeonggi-Do (KR)

(73) Assignee: Epworks Co., Ltd. (KR)

( * ) Notice: Subject to any disclaimer, the term of this patent is extended or adjusted under 35 U.S.C. 154(b) by 996 days.

(21) Appl. No.: 12/576,238

(22) Filed: Oct. 8, 2009

(65) Prior Publication Data

US 2011/0081289 A1    Apr. 7, 2011

(30) Foreign Application Priority Data

Oct. 1, 2009  (KR) .................. 10-2009-0094103

(51) Int. Cl.
- *C01B 33/02* (2006.01)
- *B01D 1/00* (2006.01)
- *B03D 1/00* (2006.01)
- *C02F 1/24* (2006.01)
- *C01B 33/037* (2006.01)
- *B03D 1/24* (2006.01)

(52) U.S. Cl.
CPC . *C01B 33/02* (2013.01); *B03D 1/24* (2013.01); *C01B 33/037* (2013.01)

USPC .......................................... 423/348; 210/703

(58) Field of Classification Search
CPC ......... B03D 1/24; C01B 33/02; C01B 33/037
USPC .......... 423/335–340, 348–350; 210/759, 767, 210/768, 703
See application file for complete search history.

(56) References Cited

U.S. PATENT DOCUMENTS

| | | | |
|---|---|---|---|
| 2009/0050565 A1* | 2/2009 | Muralidhara et al. | 210/651 |
| 2009/0107915 A1* | 4/2009 | Skinner et al. | 210/636 |

FOREIGN PATENT DOCUMENTS

| | | | | |
|---|---|---|---|---|
| JP | 10-323675 | * | 12/1998 | C02F 1/52 |
| JP | 2004-261708 | * | 9/2004 | C02F 1/52 |
| KR | 10-0823666 | | 4/2008 | |

* cited by examiner

*Primary Examiner* — Anthony J Zimmer

(57) ABSTRACT

A method for regenerating silicon from silicon waste includes: placing and mixing silicon waste, a solvent having pH of approximately 5 to approximately 6, and a surfactant within a container; and injecting air into the container to separate floating matters and precipitates. Accordingly, since silicon is easily separated from the silicon waste, the regeneration yield of silicon is increased. Since the regenerated silicon is recyclable, it may be possible to obtain important substitution effect of high-purity silicon the entire amount of which depends on import. Moreover, environmental pollution may be reduced because the amount of the silicon waste disposed of by burial is decreased.

6 Claims, 6 Drawing Sheets

< Floating matters >

METHOD FOR REGENERATING SILICON FROM SILICON WASTE AND SILICON MANUFACTURED USING THE SAME

CROSS-REFERENCE TO RELATED APPLICATION

This application claims priority to Korean Patent Application No. 10-2009-0094103 filed on Oct. 1, 2009 and all the benefits accruing therefrom under 35 U.S.C. §19, the contents of which are incorporated by reference in their entirety.

BACKGROUND

The present disclosure relates to a method for regenerating silicon from silicon waste and a silicon manufactured using the same, and more particularly, to a method for regenerating silicon from silicon waste, which is capable of easily separating silicon from silicon waste generated during a single-crystalline silicon wafer fabrication process or a semiconductor fabrication process, and a silicon manufactured using the regenerating method.

In general, a single-crystalline silicon ingot is made from high-purity polycrystalline silicon and is cut and polished to manufacture a silicon wafer. At this time, portions removed by the cutting and polishing process are silicon waste. Also, defective silicon wafers produced during a semiconductor device fabrication process and waste silicon produced by polishing or the like belong to silicon waste.

Such silicon waste is disposed of by burial because it cannot be used any more. However, the buried silicon waste causes environmental pollution. Furthermore, a large amount of silicon depends on import. Moreover, as information communication and semiconductor industries have been developed, the demand for silicon is rapidly increasing and the import costs for silicon is also increasing.

SUMMARY

The present disclosure provides a method for regenerating silicon from silicon waste, which is capable of easily separating silicon from silicon waste by controlling pH of a solvent, and a silicon manufactured using the regenerating method.

In accordance with an exemplary embodiment, a method for regenerating silicon from silicon waste includes: placing and mixing silicon waste, a solvent having pH of approximately 5 to approximately 6, and a surfactant within a container; and injecting air into the container to separate floating matters and precipitates.

pH of the solvent may be adjusted to approximately 5 to approximately 6 by adding $H_2O_2$ to deionized water.

The method may further include: separating silicon (Si) from the precipitates; and purifying and regenerating the silicon.

The silicon waste, the solvent, and the surfactant may be mixed by stirring at a temperature of approximately 70° C. to approximately 80° C.

The container may have an aspect ratio of 1 or more.

Ultrasonic waves may be applied when the air is injected into the container to separate the floating matters and the precipitates.

The silicon waste may contain silicon (Si) as a main component, and aluminum (Al) to be separated; the precipitates may contain a larger amount of silicon than the floating matters; and the precipitates may contain a smaller amount of aluminum than the floating matters.

In accordance with another exemplary embodiment, a silicon is regenerated by: placing and mixing silicon waste, a solvent having pH of approximately 5 to approximately 6, and a surfactant within a container; and injecting air into the container to separate floating matters and precipitates, wherein pH of the solvent is adjusted to approximately 5 to approximately 6 by adding $H_2O_2$ to deionized water.

In accordance with yet another exemplary embodiment, a method for regenerating waste includes: preparing a solvent where zeta potential of a main component of waste and zeta potential of a material to be separated are not zero, and pH of the solvent is adjusted to a value between an isoelectric point of the main component and an isoelectric point of the material to be separated; placing and mixing the solvent, the waste, and a surfactant within a container; and injecting air into the container to separate floating matters and precipitates.

pH of the solvent may be adjusted so that the main component has a negative zeta potential.

When the solvent with the adjusted pH is prepared, pH of the solvent may be adjusted by adding $H_2O_2$ to deionized water.

The method may further include: separating the main component from the precipitates; and purifying and regenerating the main component.

The container may have an aspect ratio of 1 or more.

It may be effective to apply ultrasonic waves to the mixture when the air is injected into the container to separate the floating matters and the precipitates.

The precipitates may contain a larger amount of the main component than the floating matters; and the precipitates may contain a smaller amount of the material to be separated than the floating matters.

In accordance with still another exemplary embodiment, a waste is regenerated by: preparing a solvent where zeta potential of a main component of waste and zeta potential of a material to be separated are not zero, and pH of the solvent is adjusted to a value between an isoelectric point of the main component and an isoelectric point of the material to be separated; placing and mixing the solvent, the waste, and a surfactant within a container; and injecting air into the container to separate floating matters and precipitates, wherein, when the solvent with the adjusted pH is prepared, pH of the solvent is adjusted by adding $H_2O_2$ to deionized water.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
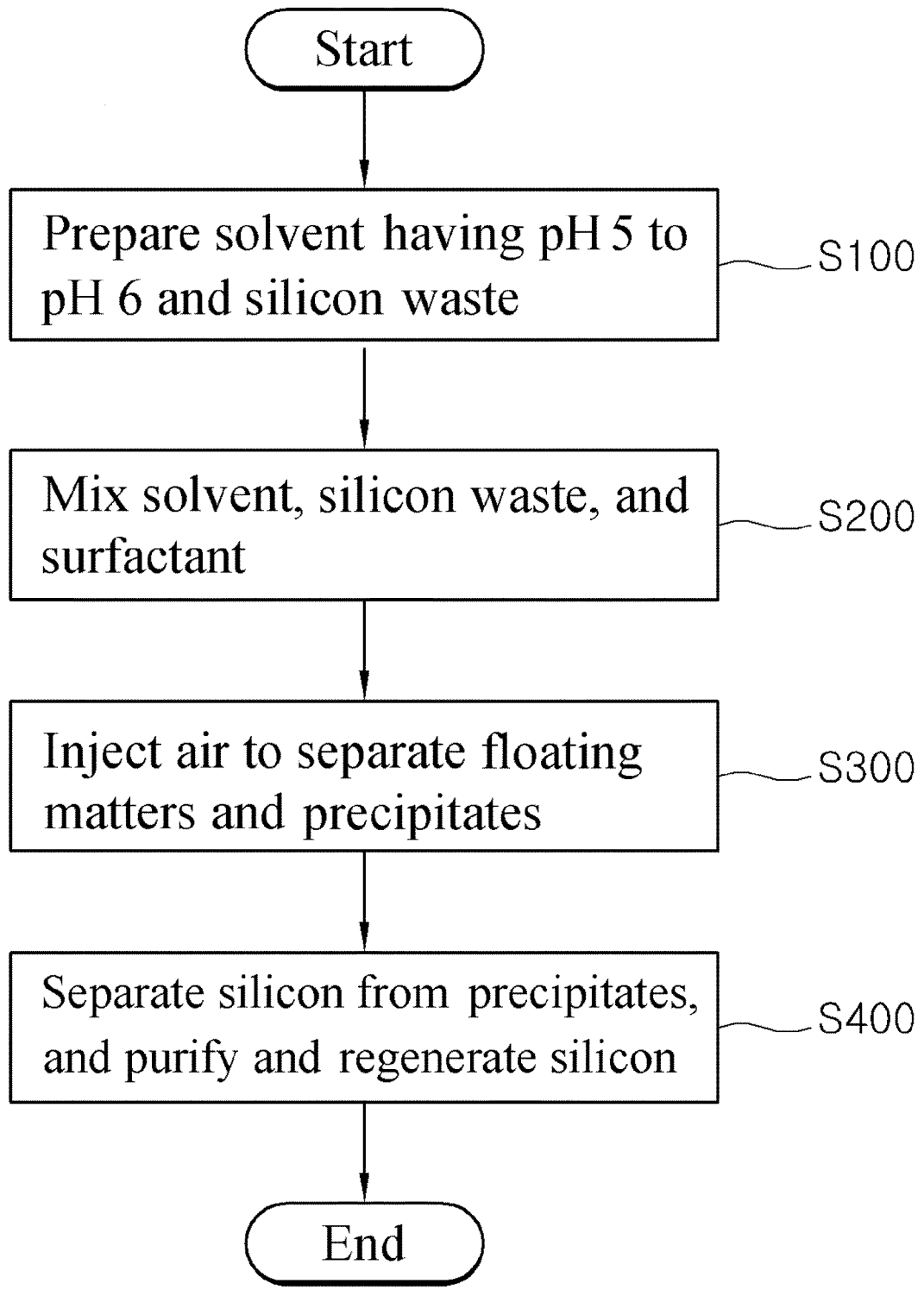
FIG. 1 is a flowchart illustrating a method for regenerating silicon from silicon waste in accordance with an exemplary embodiment.
Figure 2:
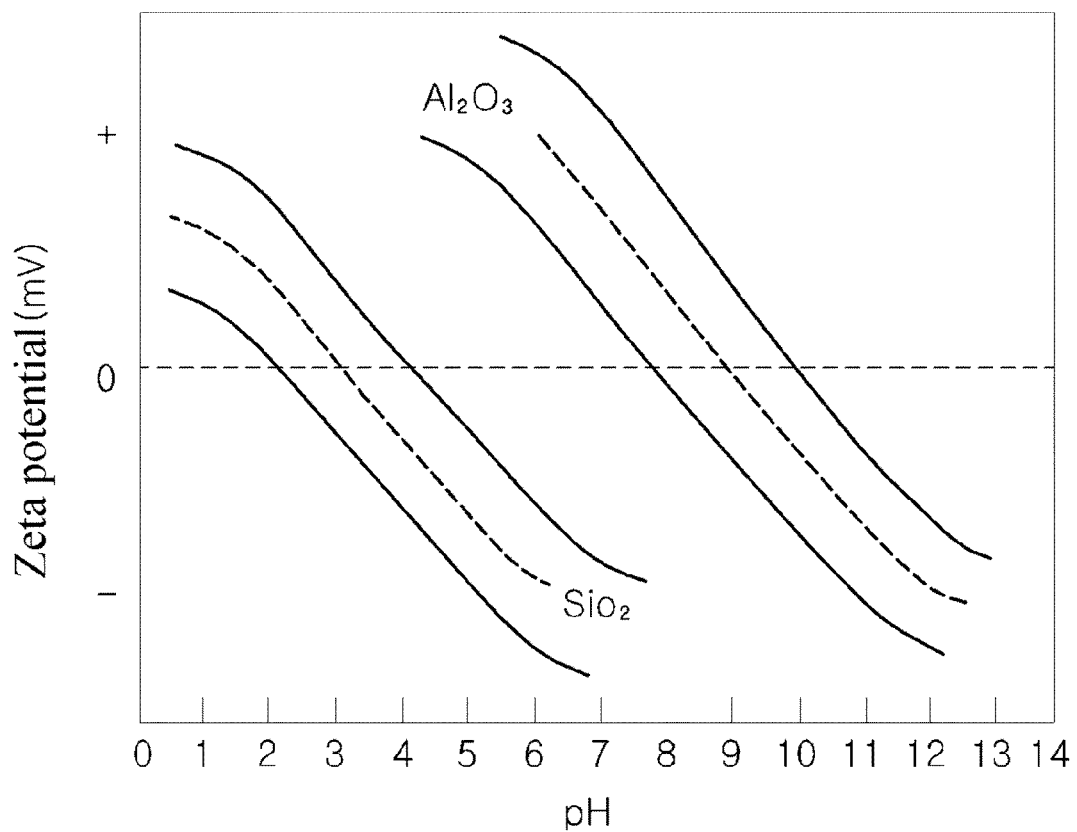
FIG. 2 is a graph illustrating zeta potential with respect to pH of $SiO_2$ and $Al_2O_3$.

FIG. 1 is a flowchart illustrating a method for regenerating silicon from silicon waste in accordance with an exemplary embodiment. FIG. 2 is a graph illustrating zeta potential with respect to pH of $SiO_2$ and $Al_2O_3$.

Referring to FIG. 1, a solvent having pH of approximately 5 to approximately 6 and silicon waste are prepared (S100). At this time, silicon which is a main component of the silicon waste in accordance with the exemplary embodiment occupies approximately 80% of the silicon waste. The solvent and the silicon waste are placed into a container, for example, a beaker, and mixed together by adding a surfactant (S200). For example, the solvent, the silicon waste. and the surfactant are placed into the container and mixed together by stirring for approximately 10 minutes to approximately 20 minutes using a magnetic bar. In the exemplary embodiment, the container having an aspect ratio of 1 or more is used. The aspect ratio in the exemplary embodiment is defined by a ratio of height to area of the container. The container having the aspect ratio of 1 or more is used in the exemplary embodiment in order to stably separate floating matters and precipitates. That is, it is done for making great different between weight % of Al contained in the floating matters and weight % of Al contained in the precipitates. Weight % of Si and Al contained in the floating matters and the precipitates according to the aspect ratio of the container will be described below.

As described above, pH of the solvent used in the exemplary embodiment may be adjusted to approximately 5 to approximately 6. pH of the solvent is adjusted by mixing deionized water with $H_2O_2$ in order to easily separate the precipitates deposited on the bottom of the container from the floating matters floating to the surface of the solvent. At this time, $H_2O_2$ may be added while the solvent is heated to a temperature of approximately 70° C. to approximately 80° C. This is because $H_2O_2$ loses its property at a temperature of higher than 80° C. The addition of $H_2O_2$ serves to adjust pH of the solvent and supply oxygen ($O_2$). Oxygen reacts with Si and Al constituting the silicon waste to generate stable $SiO_2$ and $Al_2O_3$. In the exemplary embodiment, pH of the solvent is adjusted so that $SiO_2$ has a negative zeta potential. pH of the solvent may be adjusted to approximately 5 to approximately 6. Therefore, $SiO_2$ generated in the solvent having pH of approximately 5 to approximately 6 has a negative zeta potential, and $Al_2O_3$ has a positive zeta potential.

Referring to FIG. 2, an isoelectric point of $SiO_2$ is pH 1.5 to 3.7, and an isoelectric point of $Al_2O_3$ is pH 7.4 to 9.5. The isoelectric point refers to a point where the zeta potential is zero. In the exemplary embodiment, the zeta potentials of $SiO_2$ and $Al_2O_3$ are not zero, and pH of the solvent is adjusted in a range between the isoelectric point of $SiO_2$ (pH 1.5 to 3.7) and the isoelectric point of $Al_2O_3$ (pH 7.4 to 9.5). In this case, pH of the solvent may be adjusted to a range between approximately 5 to approximately 6 so that $SiO_2$ has a negative zeta potential. Hence, the precipitates deposited on the bottom of the container within the solvent having pH 1 5 to 6 and the floating matters rising to the surface of the solvent are separated from each other. Meanwhile, when pH of the solvent is less than 5, the precipitates on the bottom of the container and the floating matters are not separated from each other, but mixed uniformly within the solvent. That is, when seen with the naked eyes, the entire solvent becomes hazy and thus it can be known that the precipitates deposited on the bottom of the container and the floating matters rising to the surface of the solvent are not separated from each other. Furthermore, when pH of the solvent is more than 6, there are almost no floating matters rising to the surface of the solvent, and most are deposited on the bottom of the container. Therefore, it can be known that when pH of the solvent is more than 6, the precipitates and the floating matters are not easily separated from each other.

The surfactant is a material containing both a hydrophilic group and a hydrophobic group. The surfactant adsorbs particles having a strong hydrophobic property and causes the particles to float to the surface of the solvent by air bubbles. That is, the particles having a strong hydrophobic property within the solvent are adsorbed on the surfactant, and the hydrophobic particles float to the surface of the solvent by air bubbles. Due to such an action, matters floating to the surface of the solvent are the floating matters, and matters deposited on the bottom of the container are the precipitates. Nonionic surfactant may be suitable for the surfactant because it generates much more air bubbles. In the exemplary embodiment, any one of glycerol, tween-based surfactant, and triton-based surfactant may be used as the surfactant.

After that, the floating matters and the precipitates are separated from each other by injecting air into the container (S300). At this time, air may be injected while the solvent is heated to a temperature of approximately 70° C. to approximately 80° C. The air serves to generate air bubbles and supply oxygen. That is, the air generates air bubbles within the solvent in cooperation with the surfactant and supplies oxygen to generate $SiO_2$ and $Al_2O_3$. As described above, $SiO_2$ generated within the solvent having pH 5 to 6 has a negative zeta potential, and $Al_2O_3$ has a positive zeta potential. At this time, hydrophobic particles in the solvent are adsorbed on the surfactant and float to the surface of the solvent, other particles are deposited on the bottom of the container. That is, the particles are separated into the floating matters floating to the surface of the solvent and the precipitates deposited on the bottom of the container. At this time, the floating matters and the precipitates contain $SiO_2$ and $Al_2O_3$. However, in accordance with the exemplary embodiment, the precipitates contain a smaller amount of Al than the floating matters. In addition, ultrasonic waves are applied to the solvent where the silicon waste and the surfactant are mixed together. Weight % of Al contained in the precipitates and the floating matters according to the application of the ultrasonic waves will be described below.

Next, the precipitates are filtered to separate silicon from the precipitates, and the silicon is purified and regenerated (S400). To this end, first, the precipitates and the floating matters are filtered. For example, the floating matters are taken away using a dropper, and the precipitates are separated by pouring the remaining mixed solution into a funnel on which a filter paper is placed. Then, the precipitates are dried. and silicon is separated from the precipitates and purified. In this way, silicon is regenerated.

As the precipitates and the floating matters are separated by the method of the exemplary embodiment, a great difference may be made between an amount of Al contained in the floating matters and an amount of Al contained in the precipitates. In the exemplary embodiment, since silicon is purified from the precipitates having a relatively smaller amount of Al than the floating matters, silicon may be easily separated and regenerated from the silicon waste.

Amounts of Si and Al contained in the floating matters and the precipitates will be compared below with reference to FIGS. 3 and 4 and Table 1. To this end. in this exemplary embodiment, the floating matters and the precipitates are separated, filtered and then dried in the above-described manner. Then, the weight % difference of Si and Al in the floating matters and the precipitates is analyzed using EDS.

Figure 3:
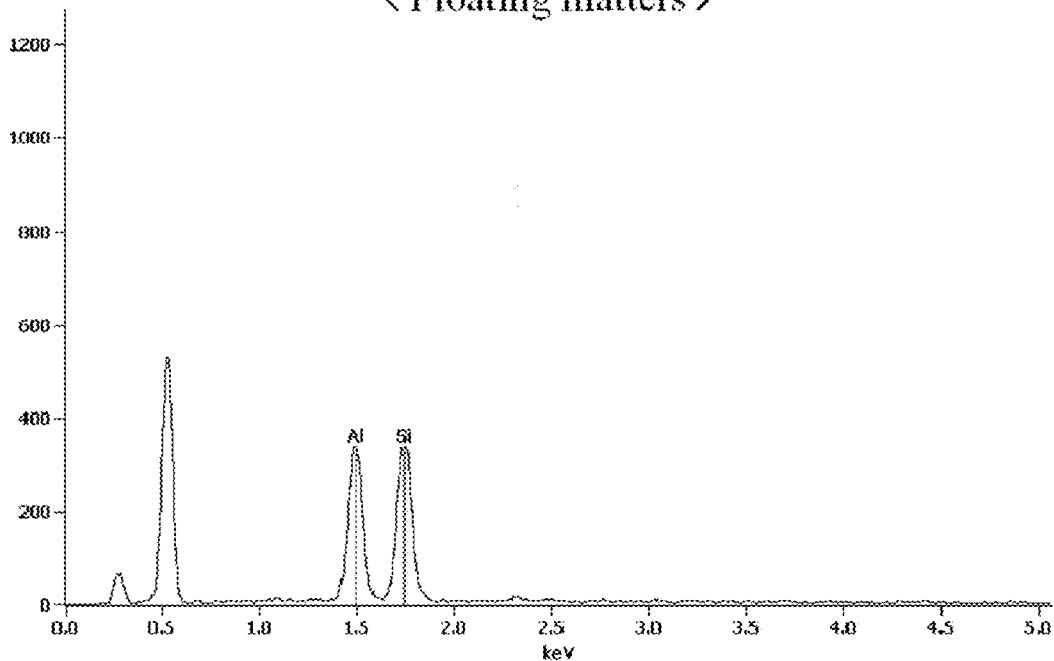
FIG. 3 illustrates the EDS analysis result of floating matter separated by the method for regenerating silicon from the silicon waste in accordance with the exemplary embodiment.

FIG. 3 illustrates the EDS analysis result of the floating matters separated by the method for regenerating silicon from the silicon waste in accordance with the exemplary embodiment. FIG. 4 illustrates the EDS analysis result of the precipitates separated by the method for regenerating silicon from the silicon waste in accordance with the exemplary embodiment. Table 1 shows weight % of Al and Si contained in the floating matters and the precipitates separated by the method for regenerating silicon from the silicon waste in accordance with the exemplary embodiment.

TABLE 1

|  | Floating matters | Precipitates |
| --- | --- | --- |
| Al (weight %) | 32.85 | 7.87 |
| Si (weight %) | 67.15 | 92.13 |

Figure 4:
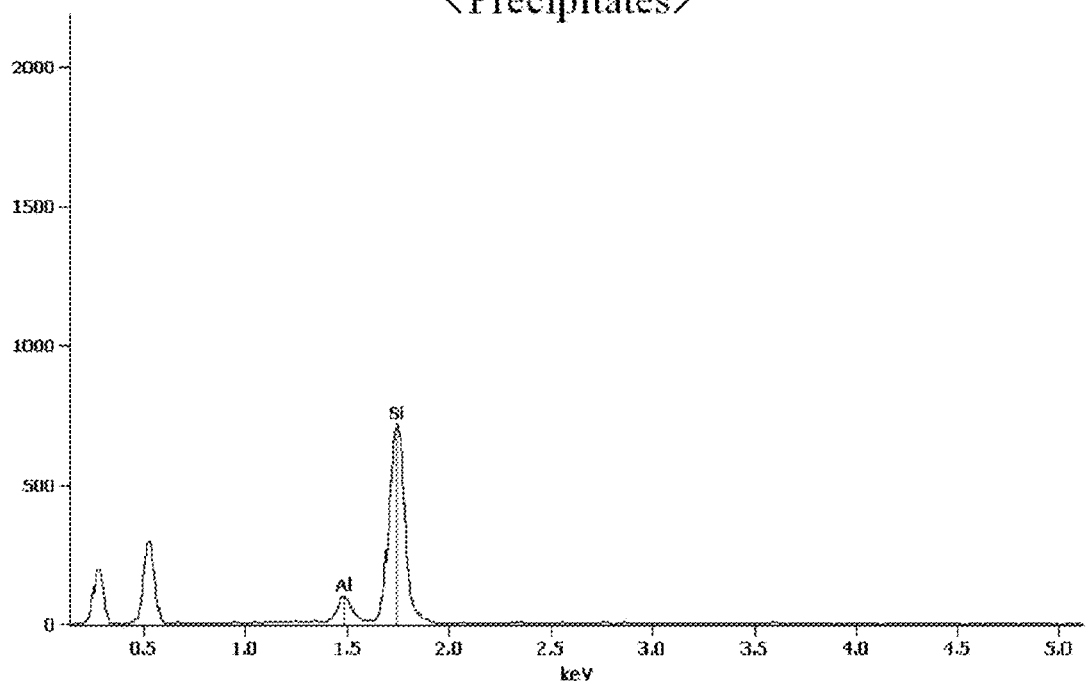
FIG. 4 illustrates the EDS analysis result of precipitates separated by the method for regenerating silicon from the silicon waste in accordance with the exemplary embodiment.

Referring to FIGS. 3 and 4, weight % of Al contained in the precipitates is smaller than weight % of Al contained in the floating matters. As shown in Table 1, the floating matters contain 32.85 weight % of Al and 67.15 weight % of Si, and the precipitates contain 7.87 weight % of Al and 92.13 weight % of Si. That is, when the floating matters and the precipitates are separated in the method of the exemplary embodiment, the amounts of Al contained in the floating matters and the precipitates are greatly different from each other. As the difference of weight % of Al contained in the floating matters and the precipitates is greater, it means that it is easier to regenerate high-purity silicon having a small content of Al.

A difference of weight % of Al contained in the precipitates and the floating matters according to change in the aspect ratio of the container and the application/non-application of the ultrasonic waves will be described below.

Figure 5:
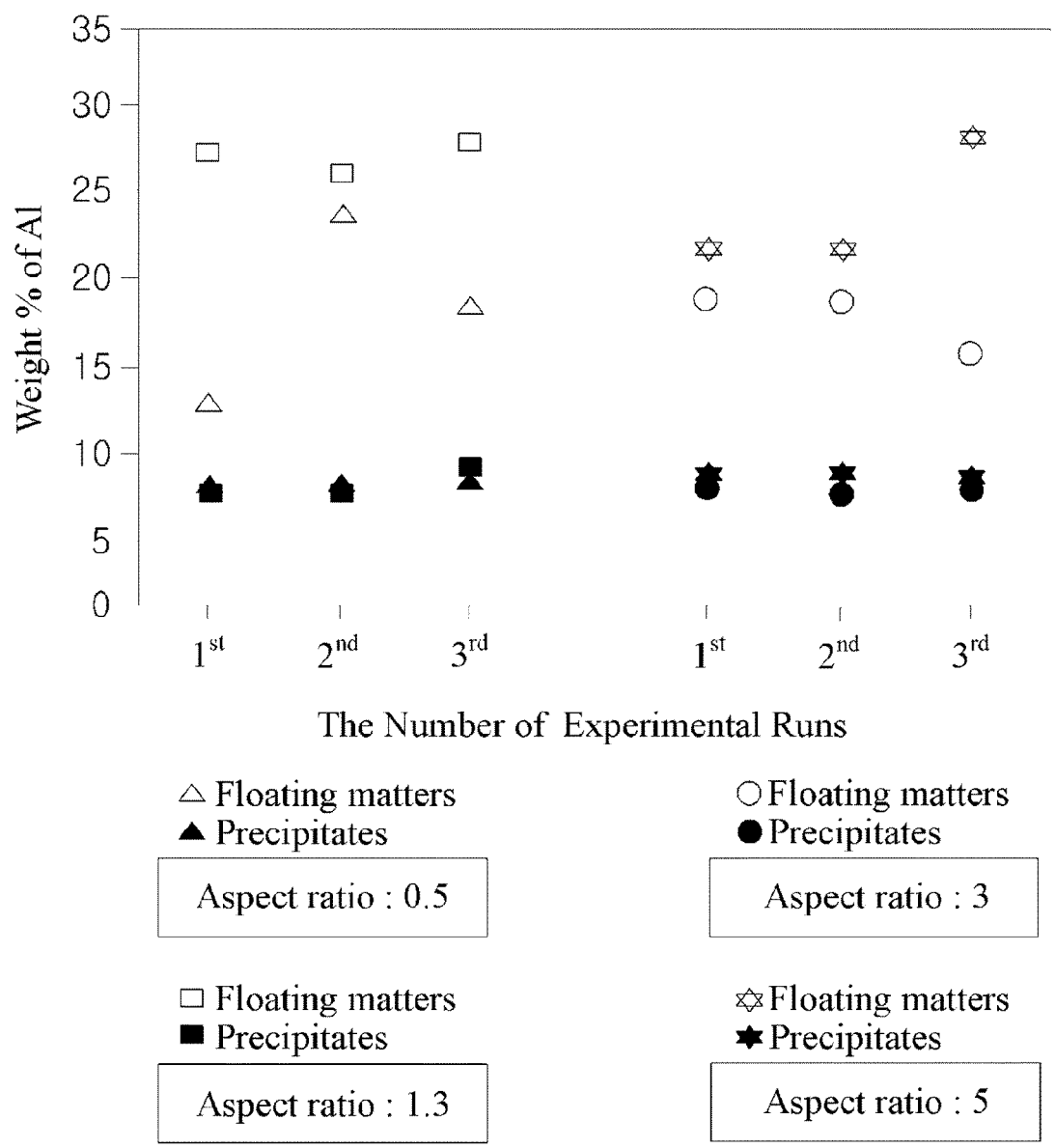
FIG. 5 is a graph showing weight % of Al contained in precipitates and floating matters, when the aspect ratio of a container is 0.5, 1.3, 3, and 5, in the method for regenerating silicon from the silicon waste in accordance with the exemplary embodiment.

FIG. 5 is a graph showing weight % of Al contained in the precipitates and the floating matters, when the aspect ratio of the container is 0.5, 1.3, 3, and 5, in the method for regenerating silicon from the silicon waste in accordance with the exemplary embodiment. The aspect ratio in the exemplary embodiment is defined by a ratio of height to area of the container. In the exemplary embodiment, the experiment was conducted three times under the conditions that the aspect ratio was 0.5, 1.3, 3, and 5, and then the experimental results were compared.

Referring to FIG. 5, it can be seen that the difference of weight % of Al contained in the floating matters and the precipitates is greater when the aspect ratio is 1.3, 3, and 5 than when the aspect ratio is 0.5. Also, it can be seen that the difference of weight % of Al contained in the floating matters and the precipitates is greater as the aspect ratio is larger. That is, the difference between the weight % of Al contained in the floating matters and the weight % of Al contained in the precipitates is greater as the aspect ratio is larger, and the container having the aspect ratio of 1 or more, preferably 3 to 5, is used in the exemplary embodiment.

Figure 6:
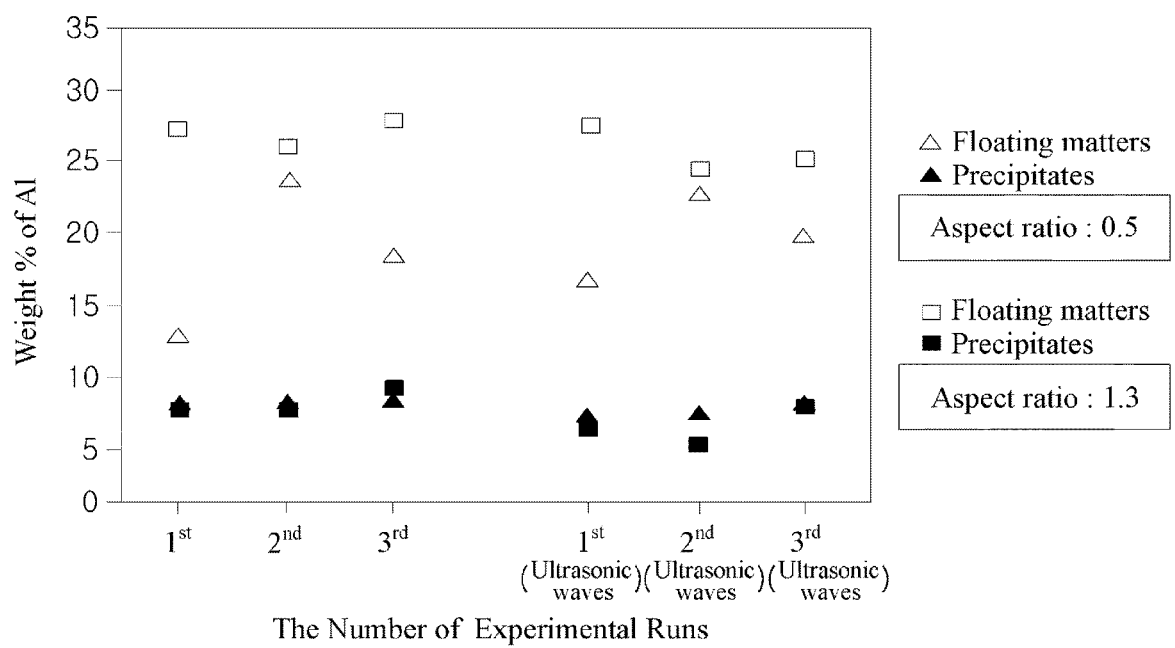
FIG. 6 is a graph showing weight % of Al contained in precipitates and floating matters according to the application/ non-application of the ultrasonic waves in the method for regenerating silicon from the silicon waste in accordance with the exemplary embodiment.

FIG. 6 is a graph showing weight % of Al contained in the precipitates and the floating matters according to the application/non-application of the ultrasonic waves in the method for regenerating silicon from the silicon waste in accordance with the exemplary embodiment. In the exemplary embodiment, the experiment was conducted three times under the conditions that the ultrasonic waves were applied and no ultrasonic waves were applied, and then the experimental results were compared.

Referring to FIG. 6, it can be seen that the weight % of Al contained in the precipitates is smaller when the ultrasonic waves are applied than when the ultrasonic waves are not applied. Also, it can be seen that the difference of weight % of Al contained in the floating matters and the precipitates is greater when the ultrasonic waves are applied than when the ultrasonic waves are not applied.

In accordance with the exemplary embodiments, the silicon waste and the surfactant are mixed in the solvent of which pH is adjusted, and air and ultrasonic waves are applied to the mixture. In this way, silicon is easily separated from the silicon waste, thereby increasing the regeneration yield of silicon.

Since the regenerated silicon is recyclable, it may be possible to obtain import substitution effect of high-purity silicon the entire amount of which depends on import. Moreover, the amount of the silicon waste disposed of by burial may be reduced, thereby reducing environmental pollution.

Although the method for regenerating silicon from silicon waste and the silicon manufactured using the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A method for regenerating silicon from silicon waste, the method comprising:
    placing and mixing silicon waste, a solvent having pH of approximately 5 to approximately 6, and a surfactant within a container;
    injecting air into the container to separate floating matters and precipitates;
    separating silicon (Si) from the precipitates; and
    purifying and regenerating the silicon (Si),
    wherein an aspect ratio dividing a height of the container by an area of the container ranges from 3 to 5,
    wherein the silicon waste, the solvent, and the surfactant are mixed by stirring at a temperature of approximately 70° C. to approximately 80° C.,
    wherein the silicon waste contains silicon as a main component, and aluminum (Al) to be separated;
    the precipitates contain a relatively larger amount of silicon than the floating matters; and
    the precipitates contain a relatively smaller amount of aluminum than the floating matters.

2. The method of claim 1, wherein pH of the solvent is adjusted to approximately 5 to approximately 6 by adding $H_2O_2$ to deionized water (DI water).

3. The method of claim 1, wherein ultrasonic waves are applied when the air is injected into the container to separate the floating matters and the precipitates.

4. A method for regenerating waste, the method comprising:
    preparing a solvent where zeta potential of a main component of waste and zeta potential of a material to be separated are not zero, and pH of the solvent is adjusted to a value between an isoelectric point of the main component and an isoelectric point of the material to be separated;

placing and mixing the solvent, the waste, and a surfactant within a container; and injecting air into the container to separate floating matters and precipitates;

separating the main component from the precipitates; and purifying and regenerating the main component, wherein an aspect ratio dividing a height of the container by an area of the container ranges from 3 to 5, wherein the silicon waste, the solvent, and the surfactant are mixed by stirring at a temperature of approximately 70° C. to approximately 80° C., wherein the silicon waste contains silicon (Si) as a main component, and aluminum (Al) to be separated;

the precipitates contain a relatively larger amount of silicon than the floating matters; and the precipitates contain a relatively smaller amount of aluminum than the floating matters.

5. The method of claim 4, wherein, when the solvent with the adjusted pH is prepared, pH of the solvent is adjusted by adding $H_2O_2$ to deionized water.

6. The method of claim 4, wherein ultrasonic waves are applied when the air is injected into the container to separate the floating matters and the precipitates.

* * * * *